United States Patent Office 3,728,330
Patented Apr. 17, 1973

3,728,330
PROCESS FOR MANUFACTURING CELLULOSE XANTHATE AND VISCOSE PREPARED FROM SAID CELLULOSE XANTHATE
Hannes Sihtola, Tiilimaki 30A, Helsinki 33, Finland, and Boris Nizovsky, Gyldenintie 14A, Helsinki 20, Finland
No Drawing. Continuation-in-part of application Ser. No. 825,390, May 16, 1969. This application June 2, 1971, Ser. No. 149,370
The portion of the term of the patent subsequent to Aug. 17, 1988, has been disclaimed
Int. Cl. C08b 9/00, 21/20
U.S. Cl. 260—217                                25 Claims

ABSTRACT OF THE DISCLOSURE

Viscose manufacturing process. Aged alkali cellulose containing 20–36 wt. percent cellulose and more than 14 wt. percent NaOH is re-steeped with a sodium hydroxide solution containing less than 15% by weight NaOH and pressed to reduce the amount of NaOH in the alkali cellulose, yielding a second alkali cellulose containing less than 14% by weight NaOH and at least 24% by weight cellulose based on the total weight of said second alkali cellulose. The second alkali cellulose is xanthated with carbon disulfide. The amount of carbon disulfide required for xanthation based on the total weight of the cellulose in the alkali cellulose is very low and for rayon staple and cellophane may be as low as 14–24% due to the low amount of sodium hydroxide and the high amount of cellulose present in the alkali cellulose.

The xanthate is thereafter dissolved in dilute sodium hydroxide or water to yield viscose.

CROSS-REFERENCE TO RELATED APPLICATION

This application is a continuation-in-part of U.S. application Ser. No. 825,390, filed May 16, 1969, entitled "Process for Making Viscose," now U.S. Pat. 3,600,379.

BACKGROUND OF THE INVENTION

The invention relates to a process for the manufacture of viscose spinning and casting solutions. The preparation of such solutions starts with a cellulosic raw material, such as chemical wood pulp, cotton linters or, preferably, dissolving grade wood pulp. By way of example, conventional processes for the manufacture of viscose begin with sheet or slurry steeping of the pulp raw material, utilizing as the steeping-lye an aqueous sodium hydroxide solution containing 17–22 wt. percent NaOH. The excess of steeping liquor is drained off and the alkali cellulose pressed, yielding a product which contains 15–17% by weight NaOH and 30–36% by weight cellulose based on the total weight of the pressed alkali cellulose.

Prior to being reacted with carbon disulfide, the alkali cellulose is shredded to produce alkali cellulose crumbs or shreds, and aged to reduce the degree of polymerization, i.e. molecular size, to a level most suitable for the final product. The alkali cellulose is then reacted with gaseous or liquid carbon disulfide to produce cellulose xanthate.

In a conventional process, once the xanthate is prepared it is dissolved in dilute sodium hydroxide solution to yield the spinning or casting solution, or "viscose" as it is commonly called. The concentration and volume of the dissolving lye are determined by the requirements of the product. The actual composition of the viscose is also dependent on the product to be manufactured; however, such viscose normally contains cellulose within the range of 4–10 wt. percent and sodium hydroxide within the range of 2.5–8 percent.

Before spinning or casting, the viscose is filtered and ripened. Filterability is a most important characteristic of viscose, and good filterability is an indispensable condition for successful operation in a rayon plant.

The sodium hydroxide present in alkali cellulose is partly combined with the cellulose and partly free. In a conventional alkali cellulose, about one-fourth of the sodium hydroxide is combined with the cellulose and three-fourths are free. During xanthation, carbon disulfide not only reacts with alkali cellulose to form cellulose xanthate, but also enters into side reactions with free sodium hydroxide. Thus, the more free sodium hydroxide the alkali cellulose contains, the more carbon disulfide and sodium hydroxide will be wasted in these side reactions. Thus, it is clear that a significant reduction of the amount of free sodium hydroxide in the alkali cellulose would significantly reduce the extent of these side reactions and, accordingly, the amount of carbon disulfide required for the process also would be reduced. Such a reduction, of course, would reduce the cost of the process significantly.

The amount of carbon disulfide required for the xanthation of the alkali cellulose depends upon the product being manufactured. The amounts most frequently used in a conventional process are as follows:

for regular and "high wet modulus"-type rayon staple and cellophane, 25–35%;
for polynosic fibers, amounts required may be as high as 50–60%;
for rayon filament, 30–40%;
for rayon cord, at least 36%.

The foregoing figures are based on the total weight of cellulose in the alkali cellulose.

Reducing the concentration of sodium hydroxide in the alkali cellulose has been suggested. U.S. Pat. 2,985,-647 to Von Kohorn teaches utilization of alkali cellulose crumbs having less than 15% by weight sodium hydroxide. This is brought about by adding a sodium hydroxide solution containing less than 15 wt. percent NaOH to conventional alkali cellulose, without removal of excess sodium hydroxide by subsequent pressing. As the amount of cellulose in the alkali cellulose remains unchanged and the amount of NaOH increases, the net result of the Von Kohorn process is an increased amount of free NaOH in the alkali cellulose and an increased weight ratio of NaOH to cellulose. As the free NaOH consumes carbon disulfide, an increased amount of $CS_2$ is required to ensure adequate xanthation. Thus, Von Kohorn teaches that 10–15 wt. percent carbon disulfide, based on the weight of alkali cellulose, be used, which corresponds to 50–75 wt. percent $CS_2$ based on the weight of cellulose in the alkali cellulose. From the figures given in the examples of the Von Kohorn patent, the cellulose content of the alkali cellulose to be xanthated is about 21 wt. percent. Thus, in the Von Kohorn process, the NaOH to cellulose weight ratio of the alkali cellulose to be xanthated is higher than that in a conventional process, and consequently the wt. percent $CS_2$ required is higher than the amount required in a conventional process. The foregoing is made clear by simply basing the calculation of the amount of $CS_2$ required on the weight of cellulose in the alkali cellulose.

The properties of the final viscose product depend upon a number of different factors. For example, the tensile characteristics of the fibers and films are affected by spinning and casting procedures. Another notable factor affecting properties is the amount of low-molecular weight carbohydrates present in the alkali cellulose prior to xanthation. Such material not only adversely affects both the preparation and spinning of the viscose, but also adversely affects many properties of the final product. For this reason, if costs were not a factor, it would be preferred to utilize as the starting raw material pulps which contain a minimum of low-molecular weight material, i.e. pulp of a very high alpha cellulose content. However, production costs of such pulps are considerable and the utilization of high alpha pulps results in increased cost of the final viscose product.

However, the degree of refinement of the pulp used as raw material has no decisive effect upon the amount of low-molecular weight material in the aged alkali cellulose. As is known, at least one half of the original low-molecular weight material of the pulp is removed during the steeping and pressing stages, and on aging new low-molecular weight material is formed. This is illustrated by the following chart showing the increase in the amount of low-molecular weight material in the alkali cellulose, when the degree of polymerization (D.P.) is reduced to the desired level, i.e. about 250, by aging. The amount of low-molecular weight material is expressed as the solubility in 10 wt. percent NaOH solution ($S_{10}$).

CHART 1

The original pulp was sulfite pulp from conifer, with an alpha cellulose content of 90.8%, viscosity 19 cp., D.P. 760, $S_{10}$ 11.1%, and steeping loss 6.1%

|  | $S_{10}$, percent [1] | D.P. |
|---|---|---|
| Alkali cellulose, immediately after steeping and pressing | 3.2 | 780 |
| Alkali cellulose, aged 24 hours at 25° C | 4.7 | 400 |
| Alkali cellulose, aged 48 hours at 25° C | 6.6 | 310 |
| Alkali cellulose, aged 72 hours at 25° C | 9.3 | 250 |

[1] Calculated on the weight of the original pulp.

The foregoing figures in Chart 1 show that only about 30% of the original low-molecular weight material remained in the alkali cellulose after the first steeping and pressing, and that the amount of low-molecular weight material tripled during aging of the alkali cellulose to the desired D.P.-level.

SUMMARY OF THE INVENTION

The problems of the prior art are overcome by the present invention, which includes a new and improved process for the manufacture of such solutions utilizing reduced amounts of carbon disulfide and/or sodium hydroxide. The process of the present invention includes re-steeping and pressing the aged alkali cellulose prepared by conventional procedures at least once with an aqueous sodium hydroxide solution of less than 15 wt. percent concentration prior to xanthation.

The re-steeping of the alkali cellulose with NaOH solution of less than 15 wt. percent concentration and subsequent pressing reduces the amount of NaOH in the alkali cellulose, as well as the weight ratio of NaOH to cellulose. This reduces the extent of undesirable side reactions between carbon disulfide and sodium hydroxide that occur during xanthation. As an additional advantage of re-steeping and pressing the aged alkali cellulose, a large portion of low-molecular weight material is removed from the alkali cellulose. Still another advantage achieved after resteeping with NaOH solution of lower concentration is a higher degree of swelling of the cellulose fibers which makes the alkali cellulose more accessible to the carbon disulfide molecules and results in a more even xanthation reaction and better solubility of the xanthate. As a consequence of the foregoing steps, a significantly smaller quantity of carbon disulfide is adequate to yield a xanthate with excellent solubility properties.

The significantly reduced amount of carbon disulfide necessary for adequate xanthation compared with the amount used in a conventional viscose process leads to significantly reduced development of toxic and unhealthy gases and effluents on spinning and casting of the viscose. This is of major importance from the point of view of environment protection.

Accordingly, an object of the invention is to effectively reduce the amount of free sodium hydroxide present in alkali cellulose.

A further object of the invention is to remove a significant amount of low-molecular weight material from alkali cellulose prior to xanthation.

A further object of the invention is to increase the degree of swelling of alkali cellulose and thus improve its accessibility to carbon disulfide prior to xanthation.

It is yet another object of the invention to provide a viscose process in which xanthation is accomplished with reduced amounts of carbon disulfide, yielding a viscose solution which exhibits excellent filterability properties.

A further object of the invention is to provide a viscose process in which on spinning or casting reduced amounts of toxic gases and effluents are developed.

An additional object of the invention is to provide a viscose process where xanthation of the alkali cellulose can be accomplished at temperatures in the range of 35–60° C. and during a time period of 15–60 minutes.

Yet another object of the invention is to provide a viscose in which the weight ratio of sodium hydroxide to cellulose is within the range 0.35–0.50.

It is still another object of the invention to provide a continuous viscose process.

A further object of the invention is to provide a more economical viscose process.

DESCRIPTION OF THE PREFERRED EMBODIMENTS

The present invention involves a re-steeping and pressing step in a viscose process which is carried out in order to reduce the ratio of sodium hydroxide to cellulose in aged alkali cellulose prior to being reacted with carbon disulfide.

The starting material of the present process is a cellulosic material such as chemical wood pulp, cotton linters or, preferably dissolving grade wood pulp. Such a material is mercerized, by known prior art procedures, as sheets or in slurry form with an aqueous sodium hydroxide solution generally containing 17–22 wt. percent NaOH and pressed or centrifuged to yield the first alkali cellulose. In conventional viscose processes the composition of alkali cellulose is 30–36 wt. percent cellulose and 15–17 wt. percent NaOH. With conventional processes, a cellulose content lower than 30% leads to incomplete xanthation, impaired solubility of the xanthate, and poor filtration of viscose. In the present process, however, the first alkali cellulose may contain 20–36 wt. percent, preferably 24–33 wt. percent cellulose and 14–17 wt. percent NaOH.

The normal procedure in making viscose is to shred the alkali cellulose and, by subjecting it to aging at 20–60° C. prior to xanthation, reduce the molecular size of the cellulose to the desired level. The higher the temperature, the faster is this depolymerization process. The reaction can be accelerated by using oxidizers or catalysts, such as peroxides or ions of cobalt and manganese.

Low-molecular weight material in alkali cellulose, whether originating in the starting material or formed during aging, is detrimental not only to the properties of the final viscose product, but also interferes with the xanthation of the long-chain fraction of the alkali cellulose. As far as is known, short-chain carbohydrate material reacts at a considerably higher rate with carbon disulfide than does long-chain, less accessible alkali cellulose, and consequently less carbon disulfide remains available for the long-chain alkali cellulose.

In the present process, the detrimental effect of low-molecular weight material in the alkali cellulose is to a great extent eliminated by re-steeping the alkali cellulose prior to xanthation, i.e. subsequent to the aging step. In case the molecular size of the material is of the desired size after the first steeping and pressing, no aging period is needed, and re-steeping is performed immediately after the first pressing.

A significant point of the present invention is that the NaOH-concentration of the re-steeping liquor is lower than 15 wt. percent, preferably 10–11%. Under these conditions the re-steeping exerts a threefold beneficial effect:

(1) The weight ratio of NaOH to cellulose is significantly reduced;

(2) The alkali cellulose fibers become considerably more swollen; and (3) A considerable fraction of the low-molecular weight material is removed.

The choice of the concentration of the re-steeping liquor is of great importance. In this regard the most effective concentration is 10–11%, because a NaOH solution has a maximum swelling and dissolving power at this concentration.

In accordance with the present invention the first alkali cellulose is aged, if necessary, re-steeped, pressed and shredded to yield the second alkali cellulose. The composition of this second alkali cellulose may be 24–36% (preferably 27–33 wt. percent) cellulose and 9.5–14 wt. percent (preferably 10–12.5 wt. percent) NaOH.

Due to the small amount of free NaOH and low-molecular weight material in the alkali cellulose, xanthation can be performed with an amount of carbon disulfide substantially lower than the amount normally used. In conventional prior art processes for making viscose, the amount of carbon disulfide required for xanthation generally exceeds 27% of the total weight of the cellulose in the alkali cellulose, for some products even more than 35% is required. After the steps of re-steeping and pressing prior to xanthation in accordance with the present invention, however, the amount of carbon disulfide can be reduced by 30–60% (compared with that in conventional processes) without impairing the properties of the viscose. Thus, for rayon staple and cellophane 14–25 wt. percent carbon disulfide based on the weight of cellulose in alkali cellulose is adequate. Amounts of carbon disulfide equal to those used in conventional processes can naturally be used in the present process, but this would not be economically advantageous.

One important feature of the present invention, however, is not only to lower the NaOH content of the alkali cellulose by re-steeping and pressing, but also to lower the NaOH to cellulose ratio of the alkali cellulose.

Manufacturers of viscose products recognize that the ratio between NaOH and cellulose in viscose is one of the most important factors which influence the production costs of viscose products.

The following figures are given to illustrate how the NaOH to cellulose ratio in the spinning solution affects the consumption of NaOH and sulfuric acid in spinning and casting.

In a conventional process for the maufacture of rayon staple, the alkali cellulose to be xanthated may contain 16 wt. percent NaOH and 32 wt. percent cellulose. After xanthation, the xanthate may theoretically be dissolved in pure water to yield a viscose spinning solution, but in practice dilute sodium hydroxide solution is always used for this purpose. Thus, theoretically the NaOH/cellulose ratio in the spinning solution may be as low as 0.50, but in practice this figure varies between 0.55 and 0.70. During spinning, all the NaOH in the spinning solution is neutralized by sulfuric acid and the NaOH consumes 1.2 times its weight in sulfuric acid. Accordingly, for each metric ton of cellulose in the viscose or for each metric ton of final oven-dry viscose product at least 500 kg. NaOH and 600 kg. $H_2SO_4$ are theoretically lost. In practice these figures are much higher, for example, 550–700 kg. NaOH and 660–840 kg. $H_2SO_4$ are lost. According to the present invention, the alkali cellulose is re-steeped and pressed before xanthation. If the concentration of the re-steeping solution is 10 wt. percent NaOH and the pressing is carried out to yield an alkali cellulose containing 32 wt. percent cellulose, the NaOH content of the alkali cellulose is about 11 wt. percent. Thus, the NaOH/cellulose ratio is about 0.34.

If, after xanthation, the xanthate is dissolved in pure water, the same ratio of 0.34 is possible for the viscose and represents the theoretical minimum. In practice, ratios in the range of 0.35–0.45 can easily be obtained. This corresponds to a consumption of 350–450 kg. NaOH and 420–540 kg. $H_2SO_4$ per ton of the final oven-dry viscose product.

It is pointed out that the second alkali cellulose, i.e. the alkali cellulose obtained after re-steeping and pressing, is very reactive and in spite of a low dosage of carbon disulfide in xanthation yields xanthate with excellent solubility properties which can be dissolved in very dilute NaOH solution to produce viscose. Thus, the NaOH to cellulose ratio can be kept at a very low level in viscose. This means that in viscose containing 9 wt. percent cellulose the NaOH concentration can be adjusted to 3.5 wt. percent, whereas the corresponding figure in a conventional viscose is at least 5.0%.

In addition to the attempts to eliminate the above-mentioned disadvantages of conventional viscose processes which have plagued the viscose industry, many attempts have been made to convert batch processes for making viscose to a continuously operating process. These attempts have for the most part been unsuccessful. In order to operate a viscose process continuously, reaction times must be reduced in order to enable reasonably large production of viscose with relatively small size machinery. As is true of chemical reactions, an increase in temperature results in an increase in the reaction rate. However, prior to the present invention, increasing the reaction temperature has not provided satisfactory results which would make continuous operation possible. The reason for this fact is that a rise in the xanthation temperature increases the rate of the carbon disulfide consuming side reactions to a greater extent than the rate of the main reaction is increased. In fact, 35° C. has been found to be the economically acceptable temperature ceiling in a conventional viscose process.

However, with the present invention, the extent of $CS_2$-consuming side reactions is decreased because of the reduced amount of NaOH and low-molecular weight material in the alkali cellulose. Thus, the xanthation temperature may be increased above that currently applied. In fact, temperatures as high as 60° C. may be employed without increasing to an unreasonable extent the amount of carbon disulfide consumed by the side reactions. The xanthation time may thus be reduced to 15–40 minutes, which facilitates making the entire viscose process continuous.

In short, because the xanthation can be carried out at high temperatures, that is, 35–60° C., it is possible to produce viscose in accordance with the present invention in a continuous manner. Continuous operation is most advantageously accomplished by feeding pulp or other cellulosic material as a continuous flow or fiber web into a series of successive zones.

The first stages of the process, i.e. steeping, draining, pressing, shredding and aging, may be carried out in the same way as in a conventional continuously operating slurry steeping process. Then, the aged alkali cellulose is disintegrated in less than 15 wt. percent NaOH solution in the re-steeping zone similar to that applied in the first steeping, thereafter drained, pressed and shredded. After removal of air by evacuation, the alkali cellulose is conveyed through the xanthation zone in which it is subjected to the xanthion reaction at a constant carbon disulfide vapor pressure. The xanthate is then dissolved in cold dilute NaOH solution to yield the final viscose spinning solution.

Of course, the pressing step may be substituted by centrifuging and as used through this specification and claims the term "pressing" is intended to include the equivalent step of centrifuging.

A major advantage attributable to the invention is that the entire process, from the beginning of the first steeping to the end of the xanthation, can be performed at an elevated, and, if desired, constant temperature. Thus, time-consuming cooling and heating periods are unnecessary and the time required from the beginning of the first steeping to the end of the xanthation can be reduced to 2.5–3 hours, if aging is accelerated by catalysts.

The improved features of the present process are further shown in the following examples. In these examples, the process of the present invention includes re-steeping alkali cellulose at least once with a steeping liquor consisting of a sodium hydroxide solution containing less than 15 wt. percent NaOH. The steeping liquor is most effective at concentrations of around 10–11% by weight NaOH because at this concentration the NaOH solution has a maximum dissolving and swelling power. Thus, the preferred range of the sodium hydroxide solution for re-steeping is between 10–11 wt. percent NaOH, with 9–15 wt. percent NaOH solutions providing operable results. The pressing step after re-steeping reduces the ratio of sodium hydroxide to cellulose in the alkali cellulose to less than 0.50, preferably below 0.40. In the preferred procedure, conventionally prepared alkali cellulose containing 20–36% by weight cellulose is used as a starting material and the cellulose content after the re-steeping and pressing steps is controlled to be within the range of approximately 27–33 wt. percent. After pressing, the resulting alkali cellulose may be shredded. Because of the low amount of sodium hydroxide and low-molecular weight material in the alkali cellulose, xanthation can be accomplished with an amount of carbon disulfide which is much less than that normally employed in a conventional process. The preferred amount of carbon disulfide in the present process when manufacturing rayon staple or cellophane is in the range of 14–24% of the weight of cellulose in the alkali cellulose. However, the lower limit can be decreased to 12% and this still provides a viscose with good filtration properties. In the manufacture of rayon filament, the dosage of $CS_2$ may vary in the range 20–32% $CS_2$. Because of the reduction in the extent of side reactions, the process can be run at a relatively high temperature, that is up to 60° C. An added advantage of being able to run the xanthation at high temperature is that the reaction is speeded up so that xanthation is completed in about 15–40 minutes.

As a further feature of the invention, once the xanthate is produced and sodium hydroxide content of the dissolving medium can be adjusted so that the viscose contains a sodium hydroxide to cellulose ratio which is less than 0.5. The preferred range of sodium hydroxide to cellulose in a "cheap viscose" is 0.35–0.45. To produce a viscose within the foregoing range, the sodium hydroxide concentration of the viscose is adjusted to be within the range of 3.2–4.5 wt. percent when the cellulose content of the viscose is in the range of 9–10%. It is pointed out that this type of viscose is economically advantageous even if the amount of $CS_2$ equals that employed in conventional processes.

Examples of the process of the present invention are given below:

SERIES 1, TESTS 1–9

Reduced $CS_2$ dosage. Softwood pulp

Eight similar samples of conifer sulfite pulp with an alpha cellulose content of 90.8% and a viscosity of 19 cp. were steeped in the same manner as sheets at 25° C. with 19 wt. percent NaOH solution and pressed in such a way that the alkali cellulose contained 30.5% cellulose and 15.7% NaOH. All samples 1–8 were aged without shredding the sheets; samples 1–4 for 60 hours at 25° C., samples 5 and 6 for 72 hours at 25° C. and samples 7 and 8 at 60° C. for 3 hours and 3½ hours, respectively. Samples 1–4 were xanthated without re-steeping with 29, 26, 23 and 20 wt. percent carbon disulfide calculated on the amount of cellulose in the alkali cellulose. Samples 5–8 were re-steeped before xanthation with a 10 wt. percent NaOH solution. The second steeping of sample 8 was slurry steeping, whereas the second steeping of samples 5–7 was effected as sheet steeping. After the second steeping, samples 5–8 were pressed, so that the composition of the alkali cellulose was 32.2% cellulose and 11.2% NaOH. In the xanthation step of samples 5–8, the amount of carbon disulfide used was as follows: sample 5, 20 wt. percent, sample 6, 16 wt. percent, sample 7, 18 wt. percent, and sample 8, 20 wt. percent calculated on the amount of cellulose in the alkali cellulose. The xanthation of all samples was carried out at 25° C. for 150 minutes. After xanthation, the cellulose xanthate in all tests 1–8 was dissolved at 20° C. in NaOH solution of a concentration and volume so chosen that the resulting viscose contained 9.0% cellulose and 5.0% NaOH.

A ninth sample of the same pulp as in tests 1–8 was steeped in the same manner as samples 1–8, except that 0.5 mg./litre cobalt as $CoCl_2$ was added to the first steeping liquor. The viscose was prepared in exactly the same way as in test 5, except that the aging temperature was 50° C. and the aging time was 1 hour.

After 18 hours of ripening, the viscosity of the viscoses obtained from samples 1–9 was determined by the falling ball method familiar in viscose technology. Filterability was evaluated on the basis of the clogging value $K_w$. In view of the filtering device and filter material used in the filtration tests with a viscose composition of 9.0% cellulose and 5.0% NaOH and a viscosity of 40–60 seconds, the following evaluation is appropriate:

$K_w$ 300 or less, excellent filterability
$K_w$ 300–500, good filterability
$K_w$ 500–800, medium filterability
$K_w$ 800 or more, poor filterability.

The results of tests 1–9 have been compiled in Table 1.

TABLE 1

| Test No. | Number of steepings | Aging Temp., °C. | Aging Time, hr. | Xanthation $CS_2$ percent | Xanthation Temp., °C. | Xanthation Time, min. | Viscose Viscosity, sec. | Viscose Filterability, $K_w$ |
|---|---|---|---|---|---|---|---|---|
| 1 | 1 | 25 | 60 | 29 | 25 | 150 | 42 | 250 |
| 2 | 1 | 25 | 60 | 26 | 25 | 150 | 45 | 610 |
| 3 | 1 | 25 | 60 | 23 | 25 | 150 | 56 | 1,220 |
| 4 | 1 | 25 | 60 | 20 | 25 | 150 | 89 | 4,520 |
| 5 | 2 | 25 | 72 | 20 | 25 | 150 | 43 | 240 |
| 6 | 2 | 25 | 72 | 16 | 25 | 150 | 54 | 450 |
| 7 | 2 | 60 | 3 | 18 | 25 | 150 | 64 | 450 |
| 8 | 2 | 60 | 3½ | 20 | 25 | 150 | 49 | 510 |
| 9 | 2 | 50 | 1 | 20 | 25 | 150 | 88 | 530 |

SERIES 2, TESTS 10–16

Reduced $CS_2$ dosage. Hardwood pulp

Tests 10–16 were made with seven similar samples of birch wood sulfite pulp with an alpha cellulose content of 92.2%, and a viscosity of 18 cp. The samples were steeped as sheets at 25° C. in the same manner with 19 wt. percent NaOH solution, pressed in such a way that the alkali cellulose contained 31.4% cellulose and 15.6% NaOH and aged without shredding, samples 10–14 for 48 hours at 25° C. and samples 15 and 16 for 2½ hours at 60° C. Samples 10, 11 and 12 were xanthated without re-steeping with 28, 24, and 22 wt. percent $CS_2$, respectively, calculated on the amount of cellulose in the alkali cellulose. Samples 13–16 were re-steeped before xanthation with a 10 wt. percent NaOH solution and pressed. After pressing, the alkali cellulose of these samples contained 32.9% cellulose and 11.4% NaOH. In the xanthation step of samples 13–16, the amount of carbon disulfide used was as follows: sample 13, 22 wt. percent, sample 14, 20 wt. percent, sample 15, 22 wt. percent, and sample 16, 20 wt. percent. The xanthation in all tests 10–16 was carried out at 25° C. for 150 minutes. The xanthate in each test 10–16 was dissolved at 20° C. in a NaOH solution of a concentration and volume so chosen that the resulting viscose contained 8.8% cellulose and 5.0% NaOH. After 18 hours of ripening, the viscosity of the viscose was determined by the falling ball method, and the filterability was evaluated on the basis of the clogging value $K_w$. The results of tests 10–16 have been compiled in Table 2.

The foregoing results indicate that after a conventional single steeping a viscose of acceptable filterability is unobtainable when xanthation is performed at high temperature (viz 50–60° C.), even if a normal amount of carbon disulfide is utilized, i.e. 28%. However, after double steeping, xanthation at high temperatures is practicable, even when much less than a normal amount of carbon disulfide is used.

In tests 19 and 20, the total time from the start of the first steeping to the end of xanthation was only 150 minutes. From these tests the conclusion can be drawn that a continuous viscose manufacturing process with a high production capacity is possible with relatively small-size machinery if the teachings of the present invention are followed.

SERIES 4, TESTS 21–24

Reduced NaOH to cellulose weight ratio in viscose

Four samples of the same conifer sulfite pulp mentioned in Series 1 were steeped as sheets at 20° C. with 19% NaOH solution and pressed as in the tests of Series 1, aged at 25° C. for 72 hours, re-steeped with 10% NaOH solution, and pressed as in Series 1. All the samples 21–24

TABLE 2

| Test No. | Number of steepings | Aging | | Xanthation | | | Viscose | |
|---|---|---|---|---|---|---|---|---|
| | | Temp., °C. | Time, hr. | $CS_2$ percent | Temp., °C. | Time, min. | Viscosity, sec. | Filterability, $K_w$ |
| 10 | 1 | 25 | 48 | 28 | 25 | 150 | 54 | 450 |
| 11 | 1 | 25 | 48 | 24 | 25 | 150 | 64 | 1,240 |
| 12 | 1 | 25 | 48 | 22 | 25 | 150 | 79 | 3,170 |
| 13 | 2 | 25 | 48 | 22 | 25 | 150 | 88 | 410 |
| 14 | 2 | 25 | 48 | 20 | 25 | 150 | 87 | 640 |
| 15 | 2 | 60 | 2½ | 22 | 25 | 150 | 67 | 380 |
| 16 | 2 | 60 | 2½ | 20 | 25 | 150 | 65 | 490 |

SERIES 3, TESTS 17–20

Raised xanthation temperature

Tests 17–20 were made with the same conifer sulfite pulp mentioned in Series 1. The samples were steeped as sheets at 25° C. with 19% NaOH solution, samples 17 and 18 for 60 minutes without the addition of a catalyst and samples 19 and 20 for 15 minutes with lye containing 0.5 mg./litre cobalt as $CoCl_2$. All samples were pressed as in Series 1. Samples 17 and 18 were aged at 60° C. for 3 hours, samples 19 and 20 at 50° C. for 80 minutes. Samples 18, 19 and 20 were then re-steeped with 10% NaOH solution, sample 18 for 60 minutes and samples 19 and 20 for 15 minutes, and pressed in the same manner as in Series 1. The amount of carbon disulfide used in the xanthation step was as follows: sample 17, 28%, sample 18, 18%, sample 19, 24% and sample 20, 20%. In all tests 17–20 the xanthation temperature was 50° C. and the xanthation time 25 minutes. The viscoses prepared contained 9.0% cellulose and 5.0% NaOH. The results have been compiled in Table 3.

were xanthated with 24% carbon disulfide at 25° C. for 150 minutes. The xanthates were dissolved in an amount of NaOH solution or water to give a cellulose content of 8.7–8.8% in the final viscose. The concentrations of the NaOH solutions were so chosen that the NaOH content of the viscose in test 21 was 5.0%, in test 22, 4.0% and in test 23, 3.5%. The xanthate in test 24 was dissolved in water. The results of tests 21–24 have been compiled in Table 4.

TABLE 4

| Test No. | Number of steepings | Aging | | Xanthation | | | Viscose | | |
|---|---|---|---|---|---|---|---|---|---|
| | | Temp., °C. | Time, hr. | $CS_2$ percent | Temp., °C. | Time, min. | NaOH, percent | Viscosity, sec. | Filterability, $K_w$ |
| 21 | 2 | 25 | 72 | 24 | 25 | 150 | 5.0 | 40 | 110 |
| 22 | 2 | 25 | 72 | 24 | 25 | 150 | 4.0 | 60 | 230 |
| 23 | 2 | 25 | 72 | 24 | 25 | 150 | 3.5 | 70 | 190 |
| 24 | 2 | 25 | 72 | 24 | 25 | 150 | 3.1 | 90 | 450 |

SERIES 5, TESTS 25–32

Reduced $CS_2$ dosage and/or NaOH to cellulose weight ratio in viscose

Eight samples of the same conifer sulfite pulp mentioned in Series 1 were steeped as sheets at 25° C. with 19% NaOH solution and pressed as in the tests of Series 1. Samples 25–28 were aged at 60° C. for 3 hours and samples 29–32 at 60° C. for 3½ hours. All samples 25–32 were then re-steeped with 10% NaOH solution and pressed as in tests 5–8. 28 wt. percent $CS_2$ was used in

TABLE 3

| Test No. | Steeping I time, min. | Aging | | Steeping II time, min. | Xanthation | | | Viscose | |
|---|---|---|---|---|---|---|---|---|---|
| | | Temp., °C. | Time, min. | | $CS_2$ percent | Temp., °C. | Time, min. | Viscosity, sec. | Filterability, $K_w$ |
| 17 | 60 | 60 | 180 |  | 28 | 50 | 25 | 64 | 15,000 |
| 18 | 60 | 60 | 180 | 60 | 18 | 50 | 25 | 68 | 330 |
| 19 | 15 | 50 | 80 | 15 | 24 | 50 | 25 | 38 | 280 |
| 20 | 15 | 50 | 80 | 15 | 20 | 50 | 25 | 32 | 380 | tests 25, 28 and 31, 24% $CS_2$ in tests 26, 29 and 32, and 20% $CS_2$ in tests 27 and 30. The xanthates were dissolved in a NaOH solution of such concentrations that the NaOH content of the viscoses was 5.0 in tests 25–27, 4.0% in tests 28–30, and 3.5% in tests 31 and 32. The volume of dissolving lye was chosen so that the cellulose content of all viscoses was 8.7–8.8%.

in Table 6. Xanthation in all tests 33–44 was carried out at 25° C., the reaction time being 150 min. In each test, the concentration and volume of dissolving lye was adjusted to yield viscoses containing 9.0% cellulose and 5.0% NaOH. The temperature at the dissolution in test 41 was 10° C., in all other tests 20° C. The results of tests 33–44 are compiled in Table 6.

TABLE 6

| Test No. | Number of steepings | 1st alkali cellulose | | 2d alkali cellulose | | Xanthation $CS_2$ percent | Viscose | |
|---|---|---|---|---|---|---|---|---|
| | | Press weight ratio | NaOH, percent | Cell., percent | NaOH, percent | Cell., percent | | Viscosity, sec. | Filterability, $K_w$ |
| 33 | 1 | 2.8 | 15.7 | 31.8 | | | 28 | 40 | 360 |
| 34 | 1 | 2.8 | 15.7 | 31.8 | | | 24 | 62 | 730 |
| 35 | 1 | 2.8 | 15.7 | 31.8 | | | 20 | 100 | 2,850 |
| 36 | 1 | 3.2 | 15.9 | 27.5 | | | 24 | 56 | 4,150 |
| 37 | 2 | 2.8 | 15.7 | 31.8 | 11.0 | 32.6 | 24 | 45 | 480 |
| 38 | 2 | 2.8 | 15.7 | 31.8 | 11.0 | 32.6 | 18 | 50 | 460 |
| 39 | 2 | 3.2 | 15.9 | 27.5 | 11.0 | 32.7 | 20 | 26 | 180 |
| 40 | 2 | 3.2 | 15.9 | 27.5 | 11.0 | 32.7 | 14 | 61 | 650 |
| 41 | 2 | 3.2 | 15.9 | 27.5 | 11.0 | 32.7 | 12 | 29 | 320 |
| 42 | 2 | 3.5 | 16.1 | 25.1 | 11.1 | 32.9 | 20 | 55 | 220 |
| 43 | 2 | 3.8 | 16.3 | 23.2 | 11.2 | 32.9 | 20 | 55 | 170 |
| 44 | 2 | 4.0 | 16.4 | 21.9 | 11.3 | 33.2 | 20 | 72 | 420 |

The results of tests 25–32 have been compiled in Table 5.

As can be seen from the results presented in Table 6 with this particular pulp, a low cellulose content in the

TABLE 5

| Test No. | Number of steepings | Aging | | Xanthation | | | Viscose | | |
|---|---|---|---|---|---|---|---|---|---|
| | | Temp., °C. | Time, hr. | $CS_2$ percent | Temp., °C. | Time, min. | NaOH, percent | Viscosity, sec. | Filterability, $K_w$ |
| 25 | 2 | 60 | 3 | 28 | 25 | 150 | 5.0 | 64 | 260 |
| 26 | 2 | 60 | 3 | 24 | 25 | 150 | 5.0 | 69 | 220 |
| 27 | 2 | 60 | 3 | 20 | 25 | 150 | 5.0 | 69 | 450 |
| 28 | 2 | 60 | 3 | 28 | 25 | 150 | 4.0 | 92 | 230 |
| 29 | 2 | 60 | 3½ | 24 | 25 | 150 | 4.0 | 69 | 300 |
| 30 | 2 | 60 | 3½ | 20 | 25 | 150 | 4.0 | 65 | 490 |
| 31 | 2 | 60 | 3½ | 28 | 25 | 150 | 3.5 | 78 | 270 |
| 32 | 2 | 60 | 3½ | 24 | 25 | 150 | 3.5 | 78 | 540 |

The results in tests 28, 29 and 31 indicate that a second steeping, carried out with 10 wt. percent NaOH solution before xanthation, offers a means of preparing viscoses which have a high cellulose content and good filterability, by the use of $CS_2$-amounts which are normal or less than normal, although the NaOH content is 20–40% lower than normal.

SERIES 6, TESTS 33–44

Reduced cellulose content in first alkali cellulose. Double sheet-steeping

Twelve samples of softwood sulfite pulp with an alpha-cellulose content 93.2% and a viscosity 31 cp. were steeped in the same manner as sheets at 25° C. with 19 wt. percent NaOH solution and pressed to different press weight ratios (PWR) as follows: samples 33, 34, 35, 37 and 38 to PWR 2.8, samples 36, 39, 40 and 41 to PWR 3.2, sample 42 to PWR 3.5, sample 43 to PWR 3.8 and sample 44 to PWR 4.0. The NaOH and cellulose contents of these alkali celluloses are given in Table 6. After aging, samples 33–36 were xanthated without re-steeping, the amounts of carbon disulfide being 28% in test 33, 24% in tests 34 and 36, and 20% in test 35. After aging, samples 37–44 were re-steeped as sheets with 10 wt. percent NaOH solution and pressed to PWR 2.6 which yields an alkali cellulose containing 11.0–11.3 wt. percent NaOH and 32.5–33.2 wt. percent cellulose. The amounts of $CS_2$ in xanthation varied in the range 12–24%. The amounts used in the different tests are given first alkali cellulose results in poor filtration in a conventional viscose process, whereas on application of double steeping the best results are obtained when the cellulose content of the first alkali cellulose is in the range 23–29%. This range falls outside the range of cellulose content of alkali cellulose in conventional manufacture of viscose.

SERIES 7, TESTS 45–52

Reduced cellulose content in first alkali cellulose. Double slurry-steeping

Eight samples of the same pulp as in Series 6 were subjected to slurry-steeping with 19 wt. percent NaOH solution at 25° C. and pressed to different PWR as follows: samples 45–47 to PWR 2.8, samples 48 and 49 to PWR 3.1, sample 50 to PWR 3.3, sample 51 to PWR 3.5 and sample 52 to PWR 3.8. The NaOH and cellulose contents of these alkali celluloses are given in Table 7. After aging, samples 45 and 46 were xanthated without re-steeping with 28% and 24% of carbon disulfide, respectively. After aging, samples 47–52 were re-steeped in slurry form with 10 wt. percent NaOH solution and pressed to the press weight ratio 2.6 which yields alkali cellulose containing 10.3–10.5 wt. percent NaOH and 32.6–33.0 wt. percent cellulose. The amount of $CS_2$ was 16% in test 49 and 20% in all the other tests. The xanthation temperature was 25° C. and reaction time 150 minutes. The concentrations and volumes of dissolving lye were adjusted to yield viscoses containing 8.9% cellulose and 4.9 wt. percent NaOH.

The results of tests 45-52 are compiled in Table 7.

TABLE 7

| Test No. | Number of steepings | 1st alkali cellulose | | | 2d alkali cellulose | | Xanthation CS₂, percent | Viscose | |
|---|---|---|---|---|---|---|---|---|---|
| | | Press weight ratio | NaOH, percent | Cell., percent | NaOH, percent | Cell., percent | | Viscosity, sec. | Filterability, K_w |
| 45 | 1 | 2.8 | 15.7 | 31.6 | | | 28 | 25 | 800 |
| 46 | 1 | 2.8 | 15.7 | 31.6 | | | 24 | 41 | 2,590 |
| 47 | 2 | 2.8 | 15.7 | 31.6 | 10.3 | 32.8 | 20 | 47 | 280 |
| 48 | 2 | 3.1 | 15.9 | 29.0 | 10.3 | 32.7 | 20 | 41 | 220 |
| 49 | 2 | 3.1 | 15.9 | 29.0 | 10.3 | 32.7 | 16 | 45 | 300 |
| 50 | 2 | 3.3 | 16.0 | 27.2 | 10.4 | 32.7 | 20 | 20 | 330 |
| 51 | 2 | 3.5 | 16.2 | 25.4 | 10.5 | 32.6 | 20 | 36 | 350 |
| 52 | 2 | 3.8 | 16.4 | 22.8 | 10.5 | 32.6 | 20 | 39 | 250 |

Also the results in Table 7 using the same pulp as in Series 6 show that in the double slurry steeping process the optimum cellulose content in the first alkali cellulose falls within the range 22-30 wt. percent.

SERIES 8, TESTS 53-57

First alkali cellulose taken from continuous mill operation

Five parallel samples of aged alkali cellulose were taken from continuous slurry steeping operation in a viscose staple fiber plant. The starting material was moist birch pulp (appr. 50% dry content) and the steeping liquor contained 50 g. hemicellulose per litre. The composition of the alkali cellulose was: 16.1% NaOH and 31.1% cellulose by weight. Samples 53 and 54 were xanthated without re-steeping and samples 55-57 were re-steeped with aqueous 10% by weight NaOH solution and re-pressed to yield a second alkali cellulose having 10.7% NaOH and 31.2% cellulose based on the weight of this second alkali cellulose. The samples were xanthated with 35%, 25% and 20% carbon disulfide, respectively, based on the weight of total cellulose in the samples, and the xanthates dissolved in dilute aqueous NaOH solution to yield viscoses containing 4.9% NaOH and 8.8% cellulose based on the weight of viscose. The results are given in Table 8.

TABLE 8

| Test No. | Number of steepings | Xanthation | | | Viscose | |
|---|---|---|---|---|---|---|
| | | CS₂, percent | Temp., °C. | Time, min. | Viscosity, sec. | Filterability, K_w |
| 53 | 1 | 35 | 25 | 150 | 44 | 640 |
| 54 | 1 | 25 | 25 | 150 | 45 | 1,330 |
| 55 | 2 | 35 | 25 | 150 | 56 | 250 |
| 56 | 2 | 25 | 25 | 150 | 56 | 440 |
| 57 | 2 | 20 | 25 | 150 | 50 | 530 |

The following figures give an example of the differences in the amount of reagents needed to practice the process of the present invention in the manufacture of rayon staple and cellophane as compared to a conventional viscose process:

| | Present invention | Conventional process |
|---|---|---|
| Cellulose in alkali cellulose, percent | 32 | 34 |
| NaOH in alkali cellulose before xanthation, kg./ton of cellulose | 340 | 480 |
| Amount of CS₂, kg./ton of cellulose in xanthation | 200 | 280 |
| Amount of NaOH in viscose, kg./ton of cellulose | 400 | 550 |

Corresponding differences are attainable in practicing the process of the present disclosure in the manufacture of viscose for tire cord and filament-type rayon.

Thus, by providing a re-steeping and pressing step in accordance with the present process, the objects of the present invention are achieved.

The invention may be embodied in other specific forms without departing from the spirit or essential characteristics thereof. The conditions presented above are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for the manufacture of viscose which includes the steps of steeping a cellulosic raw material with sodium hydroxide solution, pressing the resulting alkali cellulose to remove excess sodium hydroxide to produce a first alkali cellulose subjecting the first alkali cellulose to aging, xanthating the alkali cellulose with carbon disulfide to produce a cellulose xanthate, and dissolving said xanthate in a solvent to yield the viscose, wherein the improvement comprises re-steeping said first alkali cellulose with a sodium hydroxide solution having less than 15% by weight sodium hydroxide and thereafter pressing the alkali cellulose, said re-steeping and pressing steps reducing the amount of sodium hydroxide to produce a second alkali cellulose having a NaOH to cellulose weight ratio of less than 0.5, xanthating said second alkali cellulose with carbon disulfide, the amount of said carbon disulfide being more than 28%, based on the weight of cellulose in the second alkali cellulose, whenever the weight percent of cellulose present in the second alkali cellulose does not substantially differ from the value present in the first alkali cellulose, and dissolving the resulting xanthate in a solvent selected from the group consisting of water and dilute aqueous NaOH solution to yield the viscose.

2. The process as set forth in claim 1 also including the step of shredding said first alkali cellulose prior to aging.

3. The process as set forth in claim 1 also including the step of shredding said second alkali cellulose prior to xanthation.

4. The process as set forth in claim 1 wherein the concentration of said sodium hydroxide solution in said re-steeping step is 10-11% by weight.

5. The process as set forth in claim 1 wherein the weight percent of cellulose present in the second alkali cellulose is substantially different from the value present in the first alkali cellulose and the amount of carbon disulfide used in the xanthation step is greater than 12% of the weight of the cellulose in said second alkali cellulose.

6. The process as set forth in claim 5 wherein the amount of carbon disulfide utilized in the xanthation step in the manufacture of viscose for rayon staple and cellophane is within the range of 14-24% of the weight of the cellulose in said second alkali cellulose.

7. The process as set forth in claim 5 wherein the amount of carbon disulfide utilized in the xanthation step in the manufacture of viscose for rayon filament is within the range of 20–32% of the weight of the cellulose in said second alkali cellulose.

8. The process as set forth in claim 1 wherein the temperature at which the xanthation is performed is within the range of 35–60° C. and the xanthation time is 15–40 minutes.

9. The process as set forth in claim 1 wherein the first alkali cellulose contains 20–36 wt. percent cellulose.

10. The process as set forth in claim 9 wherein the pressing of the first alkali cellulose is substituted by centrifuging.

11. The method as set forth in claim 1 wherein the second alkali cellulose contains 9.5–14 wt. percent NaOH.

12. The process as set forth in claim 1 wherein the second alkali cellulose contains 24–36% wt. percent cellulose.

13. The process as set forth in claim 12 wherein the pressing of the second alkali cellulose is substituted by centrifuging.

14. The process as set forth in claim 1 wherein the aging of the first alkali cellulose is accelerated by the use of a member selected from the group consisting of catalysts and oxidizing agents.

15. The process as set forth in claim 1 wherein the weight ratio of NaOH to cellulose in said second alkali cellulose is within the range of 0.35–0.45.

16. The process as set forth in claim 1 wherein the xanthate is dissolved in said solvent to yield viscose with a weight ratio of NaOH to cellulose of less than 0.5.

17. The process as set forth in claim 1 wherein the aging of the first alkali cellulose is excluded.

18. The process as set forth in claim 1 wherein the cellulosic raw material is fed into the first steeping zone as a continuous fiber web.

19. A method of making cellulose xanthate from a starting material of alkali cellulose containing at least 14% by weight sodium hydroxide and 20% by weight cellulose comprising re-steeping and pressing said alkali cellulose at least once to produce a second alkali cellulose containing less than 14% by weight sodium hydroxide and more than 24% by weight cellulose and thereafter xanthating said second alkali cellulose with carbon disulfide, the amount of said carbon disulfide being more than 28% based on the weight of cellulose in the second alkali cellulose, whenever the weight percent of cellulose present in the second alkali cellulose does not substantially differ from the value present in the first alkali cellulose.

20. The method as set forth in claim 19 wherein the first alkali cellulose is re-steeped with a less than 15 wt. percent NaOH solution.

21. The method as set forth in claim 19 wherein the said first alkali cellulose is re-steeped and pressed to have a sodium hydroxide content within the range 9.5–14% of the weight of the second alkali cellulose.

22. The method as set forth in claim 19 wherein the first alkali cellulose is re-steeped and pressed to have a cellulose content of 24–36 wt. percent.

23. The method as set forth in claim 19 wherein the xanthation is performed at a temperature within the range 35–60° C.

24. A method of making viscose from alkali cellulose containing at least 14 wt. percent sodium hydroxide and 20 wt. percent cellulose comprising re-steeping and pressing said alkali cellulose at least once to produce a second alkali cellulose containing less than 14% sodium hydroxide by weight and more than 24% cellulose by weight, xanthating said second alkali cellulose with carbon disulfide, the amount of said carbon disulfide being more than 28% based on the weight of cellulose in the second alkali cellulose, whenever the weight percent of cellulose present in the second alkali cellulose does not substantially differ from the value present in the first alkali cellulose, and thereafter dissolving the resulting cellulose xanthate in a solvent selected from the group consisting of water and aqueous sodium hydroxide solution to produce a viscose with a weight ratio of sodium hydroxide to cellulose of less than 0.5.

25. The method as set forth in claim 24 wherein the weight percent of cellulose present in the second alkali cellulose is substantially different from the value present in the second alkali cellulose and the amount of carbon disulfide utilized in the xanthation step is greater than 12% by weight of the cellulose in the second alkali cellulose.

References Cited

UNITED STATES PATENTS

| | | | | |
|---|---|---|---|---|
| 2,985,647 | 5/1961 | Von Kohorn | | 106—165 |
| 3,291,789 | 12/1966 | Bridgeford | | 260—217 |
| 3,600,379 | 8/1971 | Sihtola et al. | | 106—164 |

FOREIGN PATENTS

| | | | | |
|---|---|---|---|---|
| 711,040 | 6/1954 | Great Britain | | 260—217 |

ALLAN LIEBERMAN, Primary Examiner

U.S. Cl. X.R.

106—164, 165; 260—216